United States Patent
Williams et al.

(10) Patent No.: US 10,988,104 B2
(45) Date of Patent: Apr. 27, 2021

(54) AIRBAG ASPIRATION MODULES AND RELATED VALVE ASSEMBLIES

(71) Applicant: Autoliv ASP, Inc., Ogden, UT (US)

(72) Inventors: Jeffrey D. Williams, Roy, UT (US); David W. Parkinson, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 112 days.

(21) Appl. No.: 15/801,228

(22) Filed: Nov. 1, 2017

(65) Prior Publication Data

US 2019/0126887 A1    May 2, 2019

(51) Int. Cl.
| | | |
|---|---|---|
| *B60R 21/30* | (2006.01) | |
| *B60R 21/268* | (2011.01) | |
| *B60R 21/36* | (2011.01) | |
| *B60R 21/264* | (2006.01) | |
| *B60R 21/26* | (2011.01) | |

(52) U.S. Cl.
CPC ............ *B60R 21/30* (2013.01); *B60R 21/264* (2013.01); *B60R 21/268* (2013.01); *B60R 21/36* (2013.01); *B60R 2021/26076* (2013.01); *B60R 2021/26094* (2013.01)

(58) Field of Classification Search
CPC ..... B60R 21/30; B60R 21/264; B60R 21/268; B60R 21/36; B60R 2021/26094; B60R 2021/26076; B60R 21/262; B60R 2021/2612
USPC ........................................................ 280/738
See application file for complete search history.

(56) References Cited

U.S. PATENT DOCUMENTS

| | | | | |
|---|---|---|---|---|
| 3,212,700 A | * | 10/1965 | Guienne ............. | B64C 29/0066 417/179 |
| 3,791,669 A | * | 2/1974 | Hamilton ................ | B60R 21/30 280/738 |
| 3,801,127 A | * | 4/1974 | Katter ..................... | B60R 21/30 280/738 |

(Continued)

FOREIGN PATENT DOCUMENTS

| | | |
|---|---|---|
| EP | 46275 | 2/1982 |
| WO | WO9640556 | 12/1996 |

OTHER PUBLICATIONS

Jan. 7, 2019 PCT/US18/56124 International Search Report (2 pgs).
Jan. 7, 2019 PCT/US18/56124 Written Opinion (7 pgs).

*Primary Examiner* — Frank B Vanaman
(74) *Attorney, Agent, or Firm* — Matthew D. Thayne; Thayne and Davis LLC

(57) ABSTRACT

Airbag cushion assemblies for aspirating ambient air to enhance inflation. Some embodiments may comprise an inflation module comprising an inflator and a plurality of inflation nozzles fluidly coupled with the inflator and configured to deliver inflation gas from the inflator into an airbag cushion. A housing coupled to the airbag cushion may comprise an aspiration inlet configured to allow for receipt of ambient air into the airbag cushion during inflation of the airbag cushion. The plurality of inflation nozzles may be configured to, upon actuation of the inflator, draw ambient air into the airbag cushion along with the inflation gas from the inflator. In some embodiments, a valve assembly may be positioned below the inflation nozzles and may be configured to automatically open upon actuation of the inflator and to automatically close during or following inflation of the airbag cushion.

19 Claims, 10 Drawing Sheets

(56) References Cited

U.S. PATENT DOCUMENTS

| | | | |
|---|---|---|---|
| 3,909,037 A | | 9/1975 | Stewart |
| 3,910,595 A | | 10/1975 | Katter et al. |
| 4,928,991 A | | 5/1990 | Thorn |
| 5,100,172 A | * | 3/1992 | VanVoorhies ........... B60R 21/30 |
| | | | 280/738 |
| 5,125,472 A | * | 6/1992 | Hara ................... B60N 2/4221 |
| | | | 180/271 |
| 5,437,473 A | | 8/1995 | Henseler |
| 5,588,675 A | | 12/1996 | Lotspih |
| 5,605,347 A | | 2/1997 | Karlow |
| 5,699,965 A | * | 12/1997 | Amelio ................ B64D 33/04 |
| | | | 239/127.3 |
| 6,155,600 A | | 12/2000 | Reynolds et al. |
| 6,227,566 B1 | | 5/2001 | Kusaka |
| 6,513,602 B1 | | 2/2003 | Lewis et al. |
| 6,799,777 B2 | | 10/2004 | Hawthorn |
| 7,325,830 B2 | | 2/2008 | Higuchi |
| 7,367,585 B2 | | 5/2008 | Yu |
| 7,510,212 B2 | | 3/2009 | Green |
| 7,530,596 B2 | | 5/2009 | Bito |
| 7,584,987 B2 | | 9/2009 | Choi |
| 7,695,009 B2 | | 4/2010 | Johanson et al. |
| 7,938,443 B1 | | 5/2011 | Smith |
| 9,039,038 B2 | | 5/2015 | Breed |
| 2003/0218324 A1 | * | 11/2003 | Ju .......................... B60R 21/26 |
| | | | 280/743.1 |
| 2006/0261579 A1 | | 11/2006 | Breed |
| 2007/0052222 A1 | | 3/2007 | Higuchi |
| 2014/0361522 A1 | | 12/2014 | Breed |
| 2018/0079384 A1 | * | 3/2018 | Smith .................... B60R 21/36 |

* cited by examiner

AIRBAG ASPIRATION MODULES AND RELATED VALVE ASSEMBLIES

SUMMARY

Various improvements in vehicle technologies, such as autonomous vehicles, may require changes in the way airbag assemblies operate. For example, in some autonomous vehicles, or other newer vehicles, larger airbags may be used. This may be needed, for example, due to a larger distance between the airbag module and the vehicle occupant. In some systems, it is even contemplated that a single cushion may be used to provide protection to multiple occupants.

However, deploying large airbag cushions, or multiple airbag cushions simultaneously, may introduce difficulties. For example, venting of the ambient air within a vehicle may be needed to mitigate the increase in pressure caused by the displacement of air inside the vehicle resulting from deployment. Airbag assemblies that aspirate ambient air into the airbag cushion during deployment may allow for alleviating some of these difficulties. However, existing aspirating airbag assemblies suffer from many drawbacks, such as being large, bulky, and/or complicated, often requiring many different components and valve mechanisms.

In addition, it may be desirable for such assemblies to provide a closed-open-closed function whereby the assembly is initially closed, opens during inflation to draw in ambient air to assist with inflation gases, and then closes again at a desired point during or after inflation to prevent undue leakage of inflation gases and/or ambient air, thus compromising restraint. Some such assemblies provide an undesired delay in closure and allow more leakage than would otherwise be desired at or near the end of inflation.

The present inventors have therefore determined that it would be desirable to provide systems and methods that overcome one or more of the foregoing limitations and/or other limitations of the prior art. In some embodiments, the inventive concepts disclosed herein may allow for replacement of complicated components of previous systems by, for example, molding some or all of the jets or gas directing components integrally into a plastic housing, sewing or otherwise coupling relatively simple valve features into the assembly to simply and economically control the direction of aspirating gas flow, and/or employ pre-crash deployment sensor(s) to increase the amount of time allowed for aspiration.

In some embodiments, the jets and/or inflation nozzles may be positioned above the flaps and/or valves relative to the airbag cushion or otherwise such that the flaps/valves are positioned in between the aspiration inlet and the airbag cushion. This may allow for decoupling the valve functionality from the inflation nozzles to improve upon desired closure characteristics and/or reduce unwanted leakage. In other words, in some preferred embodiments, the function of introducing inflation gases into the cushion may be decoupled from the function of closing the valve(s)/flap(s) to allow for more efficient closure by allowing for pressure from the cushion to close the valve(s)/flap(s) independent of the inflation gases entering the cushion through the inflation nozzles/tubes from the inflator.

In a more particular example of an airbag cushion assembly according to some embodiments, the assembly may comprise an airbag cushion and an inflation module comprising an inflation end coupled with the airbag cushion and an aspiration end opposite from the inflation end. The inflation module may comprise an inflator housing comprising an inflator, a plurality of inflation nozzles fluidly coupled with the inflator, and a valve housing coupled to the inflator housing. The valve housing may comprise at least one valve. An aspiration inlet may be positioned in or otherwise coupled with the valve housing and may be configured to allow for receipt of ambient air into the airbag cushion during inflation of the airbag cushion. In some embodiments, the at least one valve may be positioned adjacent to the aspiration inlet and/or spaced apart from the inflation nozzles.

In another example of an airbag cushion assembly according to other embodiments, the assembly may comprise an airbag cushion, and an inflation module comprising an aspiration side and an inflation side. The inflation module may comprise an inflator and a plurality of inflation nozzles, such as high-velocity inflation nozzles, fluidly coupled with the inflator. The plurality of inflation nozzles may be configured to deliver inflation gas from the inflator into the airbag cushion from the inflation side of the inflation module. A housing may be coupled to the airbag cushion adjacent to the inflation side of the inflation module, wherein the housing comprises an aspiration inlet configured to allow for receipt of ambient air into the airbag cushion during inflation of the airbag cushion, and wherein the plurality of inflation nozzles is configured to, upon actuation of the inflator, draw ambient air into the airbag cushion along with the inflation gas from the inflator. The airbag cushion assembly may further comprise a valve assembly comprising at least one valve configured to open upon actuation of the inflator and configured to close during inflation of the airbag cushion to prevent air and inflation gas from exiting through the aspiration inlet. In preferred embodiments, the at least one valve is positioned between the aspiration inlet and the plurality of inflation nozzles.

In some embodiments, the aspiration side of the inflation module may be positioned opposite from the inflation side. In some embodiments, the at least one valve may be configured to automatically close at a predetermined stage during inflation of the airbag cushion. In some embodiments, the at least one valve may comprise a plurality of flaps. In some such embodiments, at least one of the plurality of flaps may comprise a butterfly flap configured to automatically open and close at least two separate openings of the aspiration inlet.

In some embodiments, the housing may comprise an inflation housing. The plurality of inflation nozzles may be positioned within the inflation housing. Some embodiments may further comprise a valve assembly housing coupled with the inflation housing. The valve assembly may be positioned within the valve assembly housing.

In some embodiments, the at least one valve may be biased towards a closed position.

In an example of an airbag cushion inflation module according to some embodiments, the module may comprise an inflator housing comprising an aspiration inlet configured to allow for receipt of ambient air into the airbag cushion during inflation of an airbag cushion coupled with the airbag cushion inflation module; an inflator; and a plurality of inflation nozzles, such as high-velocity inflation nozzles, configured to deliver inflation gas from the inflator. Preferably the inflation nozzles are configured to, upon actuation of the inflator, draw ambient air through the aspiration inlet. The module may further comprise a valve assembly comprising at least one valve flap configured to open upon actuation of the inflator, wherein the at least one valve flap is configured to close following aspiration of an airbag cushion coupled with the airbag cushion inflation module to prevent air and inflation gas from exiting through the aspiration inlet following inflation of the airbag cushion.

In some embodiments, the valve assembly may be configured such that the at least one valve flap is spaced apart from nozzle openings of the plurality of inflation nozzles.

In some embodiments, the valve assembly may be configured to bias the at least one valve flap towards a closed position in which the aspiration inlet is blocked.

In some embodiments, the valve assembly may be configured such that the at least one valve flap is fully positioned on the opposite side of the plurality of high-velocity nozzles relative to the airbag cushion in both an open position in which the aspiration inlet is open and a closed position in which the aspiration inlet is closed by the at least one valve flap.

In some embodiments, the valve assembly may be configured such that the at least one valve is positioned away from a flow path of the plurality of high-velocity nozzles.

Some embodiments may further comprise a valve assembly housing configured to house the at least one valve flap. In some such embodiments, the valve assembly housing may be positioned on an opposite side of the plurality of high-velocity nozzles relative to the airbag cushion.

In another example of an airbag inflation module according to other embodiments, the module may comprise a housing configured to be coupled with an airbag cushion. The housing comprises an aspiration inlet configured to allow for receipt of ambient air into the airbag cushion during inflation of the airbag cushion. The module may further comprise an inflator configured to facilitate inflation of the airbag cushion and a plurality of inflation nozzles fluidly coupled with the inflator. The plurality of inflation nozzles may be configured to deliver inflation gas from the inflator and to, upon actuation of the inflator, draw ambient air though the aspiration inlet along with the inflation gas from the inflator. A valve assembly may be positioned between the plurality of inflation nozzles and the aspiration inlet. The valve assembly may be configured to function in an open position in which ambient air is allowed to pass through the aspiration inlet and a closed position in which at least a portion of the valve assembly at least substantially blocks the aspiration inlet.

In some embodiments, the valve assembly may comprise one or more (in some such embodiments, a plurality) valve flaps configured to automatically open and close during inflation of the airbag cushion from pressure differentials between an inside of the airbag cushion and ambient air pressure.

In some embodiments, the valve assembly may further comprise means for biasing the one or more valve flaps towards the closed position, such as a spring-loaded hinge.

In some embodiments, the valve assembly may comprise valve flap(s) made up of a flexible material configured to flex and change shape during aspiration.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
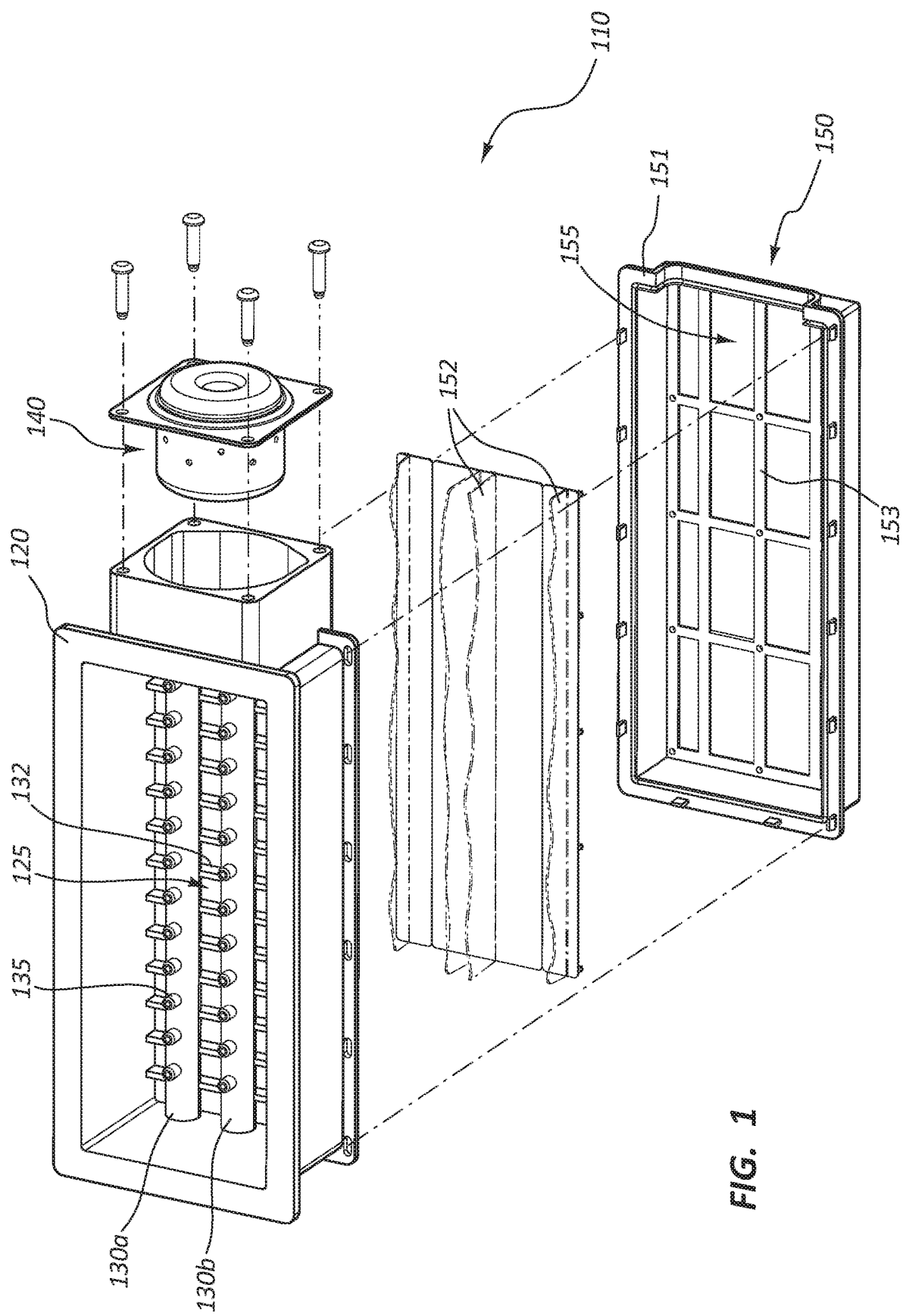
FIG. 1 is an exploded, perspective view of an airbag inflation module according to some embodiments.
Figure 2:
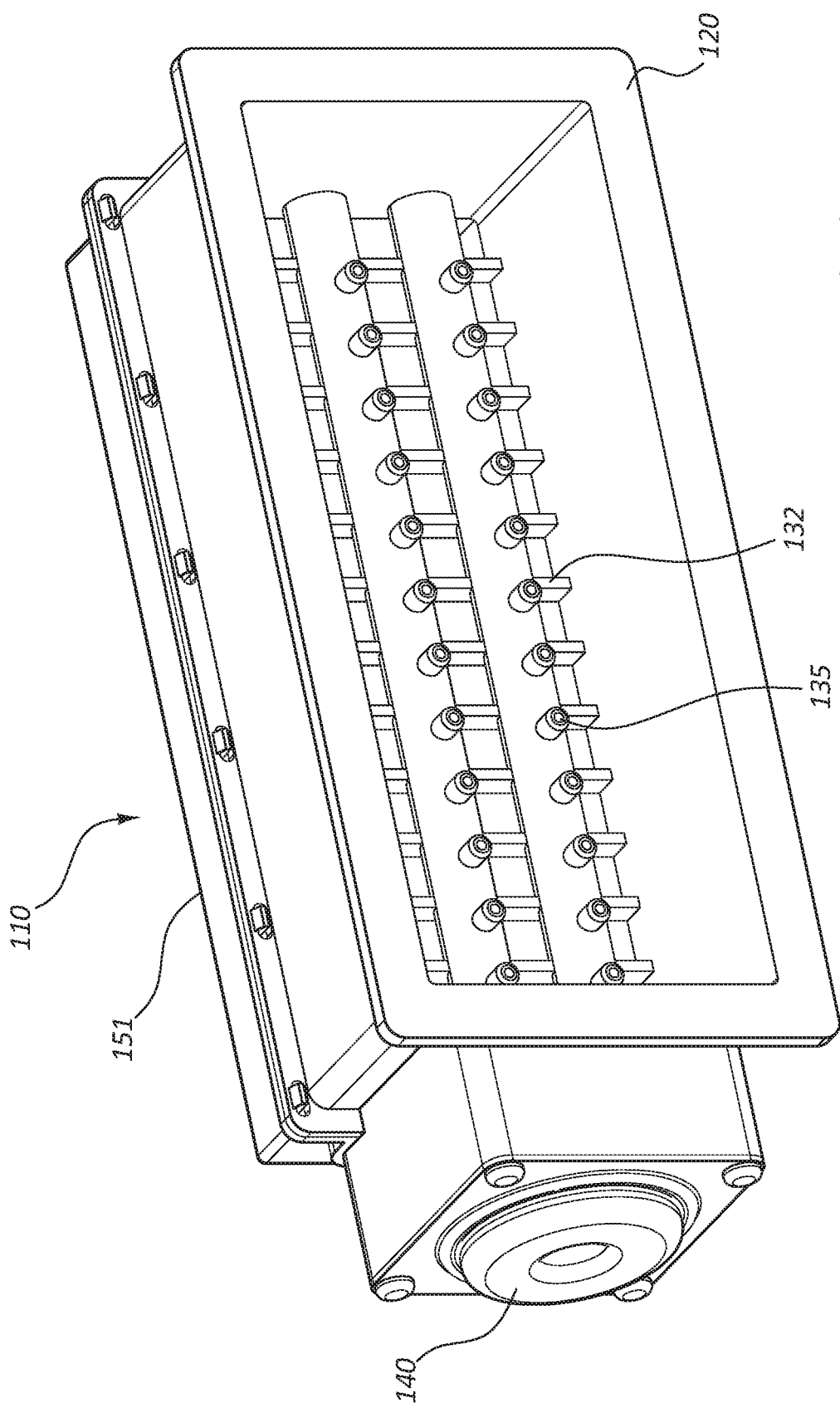
FIG. 2 is an upper perspective view of the airbag inflation module of FIG. 1.
Figure 3:
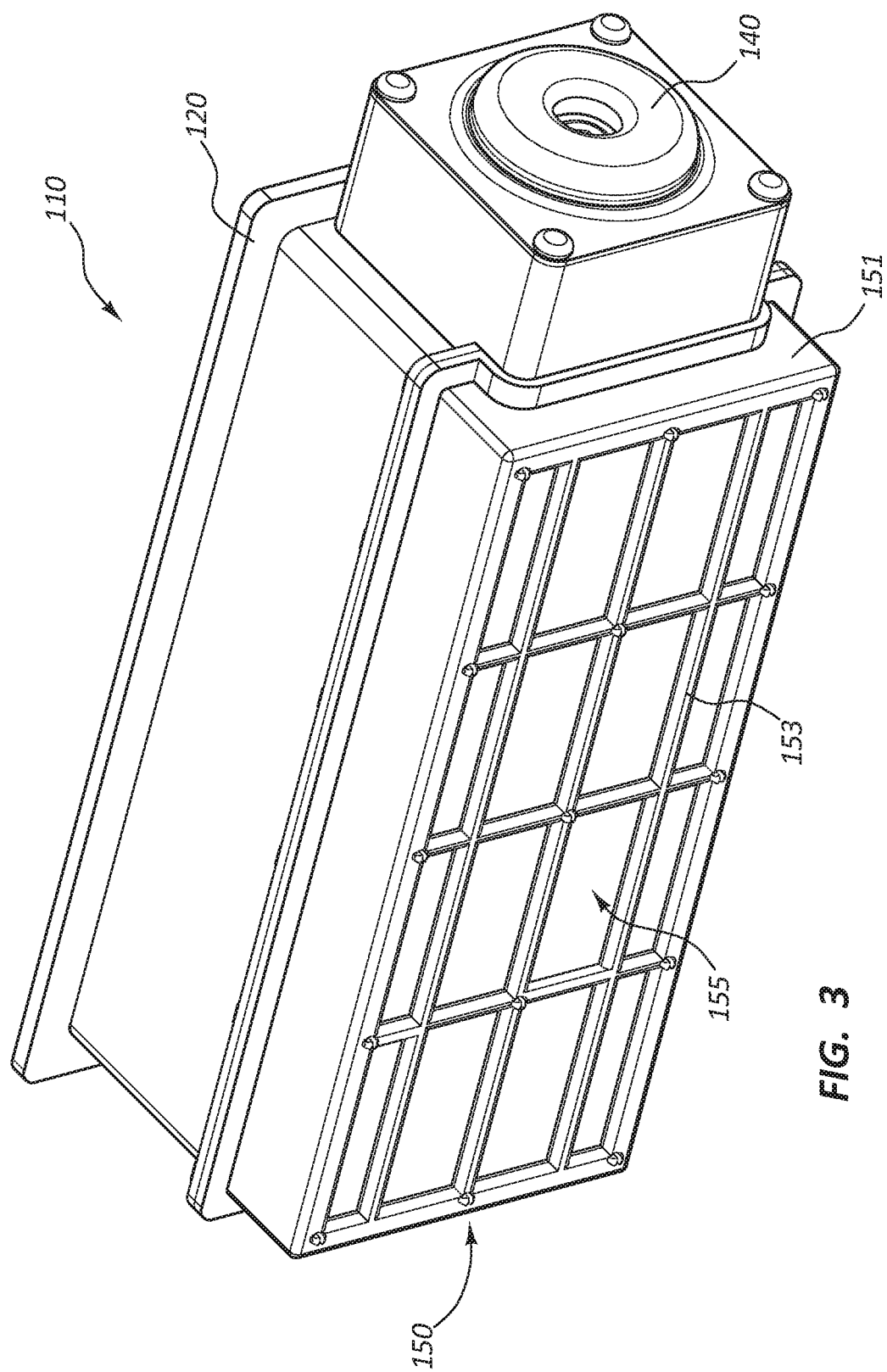
FIG. 3 is a lower perspective view of the airbag inflation module of FIG. 1.
Figure 4:
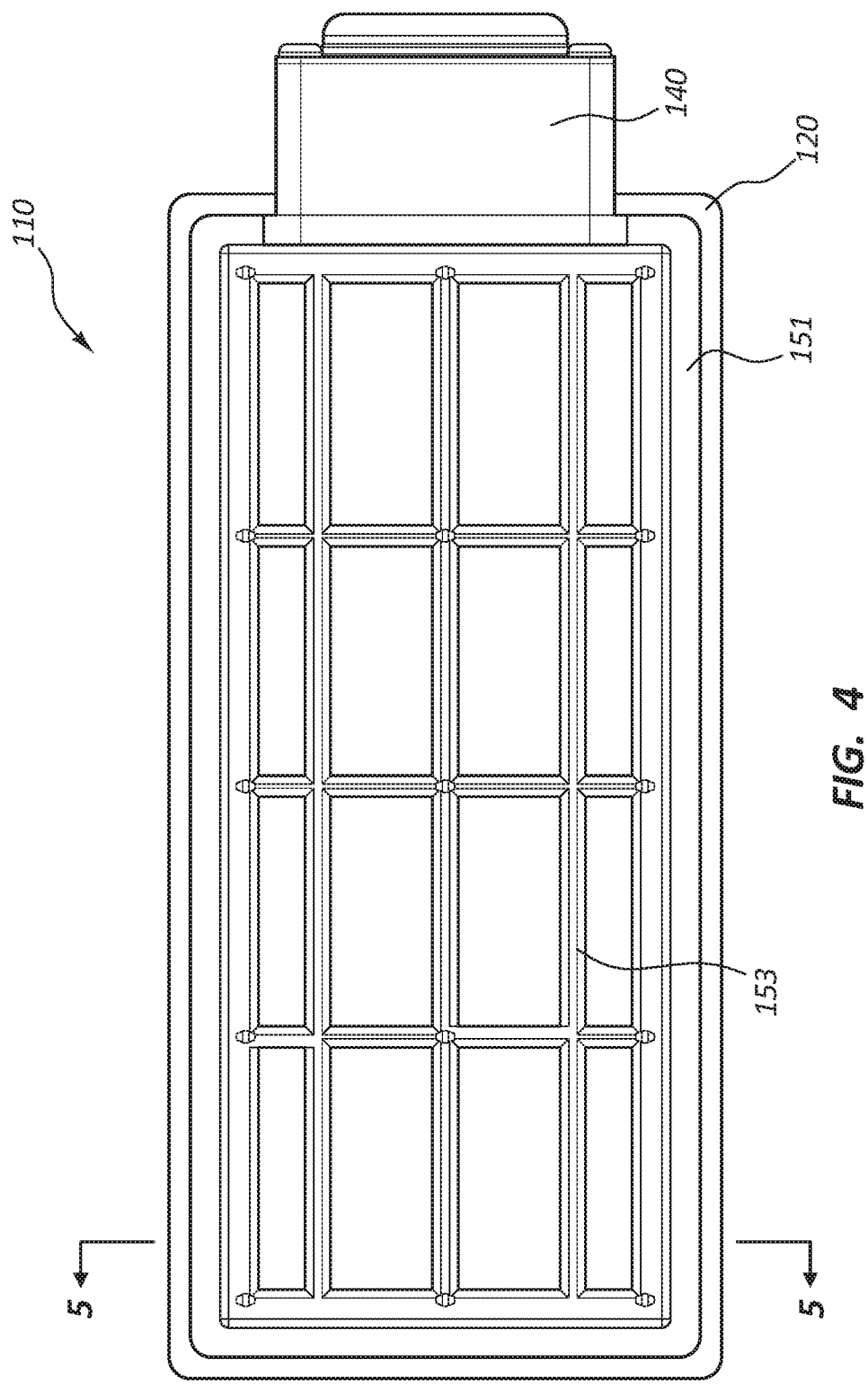
FIG. 4 is a lower plan view of the airbag inflation module of FIG. 1.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to aspirating airbag cushion assemblies configured to utilize ambient air, in some cases along with inflation gas, to inflate larger airbag cushions, such as, in some embodiments, airbag cushions for multiple occupants, airbag cushions for autonomous vehicles, or pedestrian airbag cushions.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIGS. 1-4 depict an airbag inflation module 110 for use in connection with certain airbag cushion assemblies disclosed herein. Airbag inflation module 110 comprises an inflation module housing 120 comprising an inflator 140 and a plurality of inflation nozzles 135 and a valve assembly 150 comprising a valve housing 151 and one or more valves. It should be understood that airbag inflation module 110 is configured to be coupled to an airbag cushion (not depicted in FIG. 1). Thus, the valve(s) of valve assembly are configured to selectively block an aspiration inlet to allow for inflation of an airbag cushion in stages. In addition, although housings 120 and 151 are depicted as separate housings coupled with one another, it should be understood that, in alternative embodiments, all of the various elements of inflation module 110 may be housed in a single housing (in some embodiments an integral housing).

More particularly, as described in greater detail below, the valve(s) of valve assembly 150 are preferably configured to operate in a closed configuration initially, and then automatically open during inflation, which may be caused by generating a partial vacuum within the airbag cushion by, for example, the inflation gas of nozzles 135. Following inflation, the system may be configured to automatically close again to maintain gases (both ambient air and inflation gas) in the cushion during occupant contact. The system may be specifically configured to provide for these three stages automatically at desired times by virtue of the positioning and configuration of the valve(s) and inflation nozzles.

Housing 120 comprises an aspiration inlet 125 at one end that is configured to allow for receipt of ambient air into the airbag cushion during inflation of the airbag cushion. In the depicted embodiment, aspiration inlet 125 is defined by a plurality of openings positioned in between inflator conduits 130*a*, 130*b*, and 130*c*, each of which comprises a plurality of high-velocity nozzles 135, along with a plurality of support members 132 extending perpendicular to the inflator conduits 130*a*, 130*b*, and 130*c*. As will be discussed in detail below, aspiration inlet 125 is configured to fluidly couple an internal portion of an airbag cushion with ambient air upon opening a suitable valve to allow for introduction of ambient air into the airbag cushion along with inflation gas from nozzles 135.

Similarly, valve assembly housing 151 may provide an aspiration inlet 155 that may be fluidly coupled with aspiration inlet 125. Thus, when valves 152 are in a closed configuration, aspiration inlets 125 and 155 are blocked, or at least partially blocked, to prevent or at least inhibit ambient air from entering the accompanying airbag cushion. Similarly, when valves 152 are in an open configuration, aspiration inlets 125 and 155 provide a series of openings through which ambient air can flow to facilitate inflation of the airbag cushion.

It is preferred that a relatively large number of nozzles be used in order to create a sufficient pressure differential to drive the aspiration and to provide uniform distribution of the inflation gas driving aspiration. Although thirty-six nozzles are shown in the preferred embodiments depicted in the drawings, this precise number is not required. In addition, preferably each of the high-velocity nozzles 135 is configured to keep the inflation gas delivered therethrough in a relatively tight column while being delivered into the airbag cushion rather than expanding into a plume of gas. This may further facilitate creation of the desired pressure differential to drive the aspiration process. Thus, it is preferred that the pressure driving the nozzles 135 not exceed about 500 psi. It may also be preferred that this pressure be at least about 100 psi. Thus, in some preferred embodiments, the pressured within the inflator conduits 130 is between about 100 and about 500, or, in some such embodiments, between 100 and 500, psi.

Although a relatively high-velocity may be desirable, in some embodiments, it may be preferred to keep the velocity of the gas from nozzles 135 from reaching a certain upper limit. For example, in certain preferred embodiments, the airbag inflation module 110 may be configured such that the gas delivered from nozzles 135 is below supersonic velocities. This may be useful in preventing the plume created by the incoming gas from getting too large. Thus, it may be preferred to keep the gas from nozzles 135 as close to being delivered in a vertical column/stream as possible.

It may also be preferred that the nozzles be spaced apart from one another sufficiently such that the streamlines of the expanding gas do not intersect, or at least intersect minimally. Thus, preferably the nozzles are spaced apart with the maximum amount of space in between each adjacent nozzle within the area allotted to the aspiration inlet, such as the case in the depicted embodiment.

Airbag inflation module 110 further comprises an inflator 140. Inflator 140 is fluidly coupled with inflator conduits 130*a*, 130*b*, and 130*c*, which, in turn, are fluidly coupled with nozzles 135. Nozzles 135 are configured to deliver inflation gas from inflator 140 into an airbag cushion at a high rate of velocity and/or rate of volume/time such that ambient air is drawn into the airbag cushion with the inflation gas from nozzles 135 through aspiration inlets 125 and/or 155 such that the airbag cushion is inflated by both the inflation gas and the ambient air together.

In alternative embodiments, rather than providing a plurality of spaced nozzles, conduits 130 may be provided with a linear slit or other opening positioned along one or more of their respective upper ends.

Figure 6:
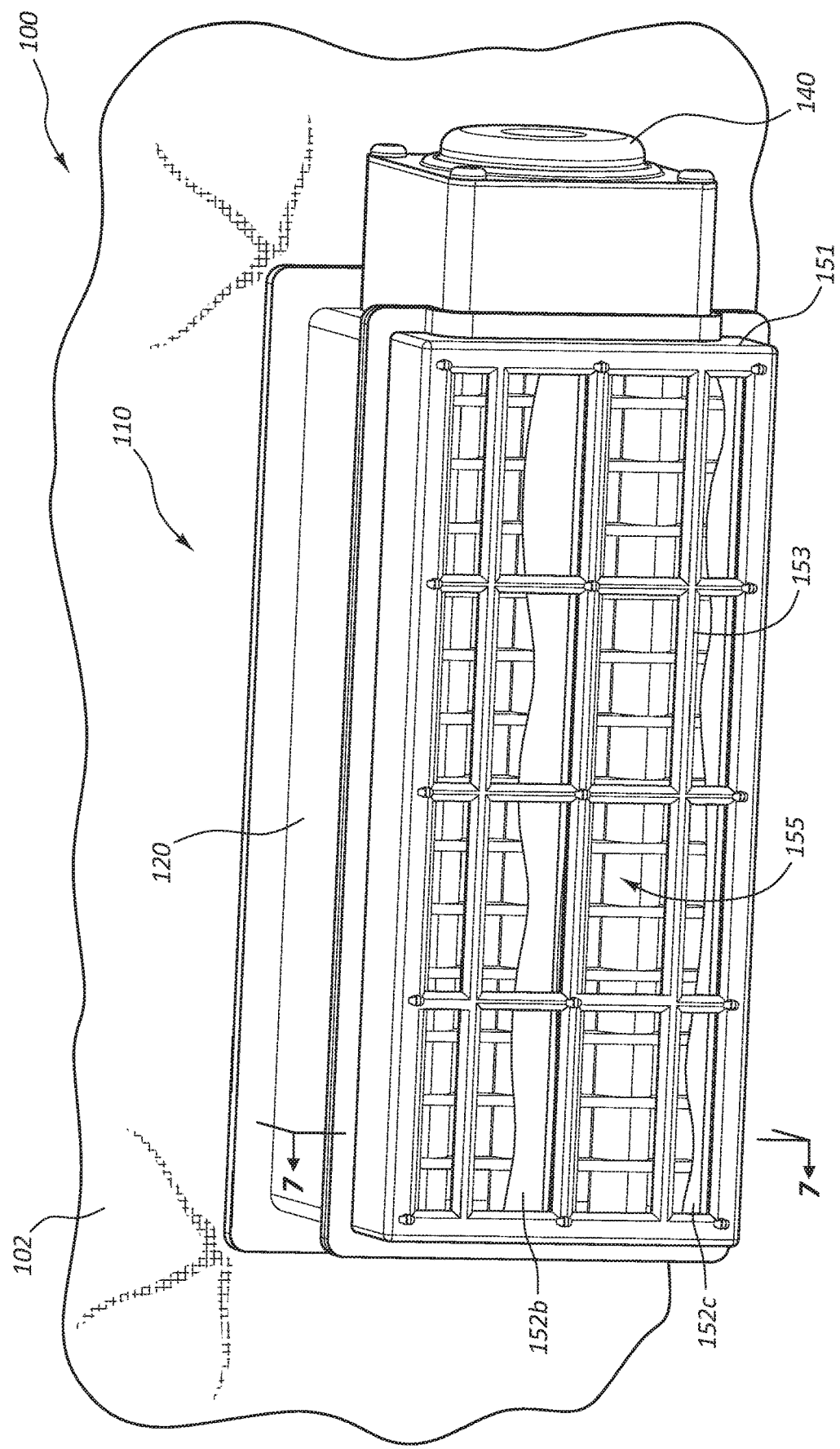
FIG. 6 is a lower perspective view of the airbag cushion assembly of FIG. 5 during deployment.

Valve assembly 150 comprises one or more valve flaps 152. For example, in the depicted embodiment, three valve flaps 152 are provided, namely, a central butterfly valve flap 152*b*, and two opposing valve flaps 152*a* and 152*c*, each of which is configured to block a portion of aspiration inlet 155, which may be defined by one or more cross-members 153. In some embodiments, valve flaps 152 may be sufficiently flexible such that the flaps flex during inflation, as depicted in FIGS. 1 and 6. In some embodiments, however, valve flaps 152 may be sufficiently rigid so as to maintain a bias towards their respective closed configurations. In other words, valve flaps 152 may be configured to require force to open (generated by a partial vacuum within an associated airbag cushion) and are otherwise biased towards their respective closed configurations. Although the valve flaps 152 themselves may be configured to perform this function alone in some embodiments, in other embodiments, a support member of such valve flaps, such as a hinge, may be provided to facilitate a desired opening and closing function. In some embodiments, valve flaps 152 may comprise a rigid thermoplastic material.

In some embodiments, valve flaps 152 may comprise one or more grooves 154 formed therein. In some such embodiments, these grooves 154 may be used to facilitate desired functionality, such as facilitate opening of the valve flap(s) 152. For example, in some embodiments, the valve flap(s) 152 may be coupled to a portion of a housing, such as cross-members 153 by way of, for example, pins, screws, bots, adhesive, or other fasteners. A region of valve flap(s) 152 adjacent to this coupling may be formed with one or more grooves 154, which groove(s) 154 may extend parallel, or at least substantially parallel, to the cross-member 153 or another region of the housing to which the valve flap(s) 152 are coupled to serve as a "hinge" for facilitating opening and/or closing of the valve.

The structure and/or manner in which valve flaps 152 are coupled with valve assembly housing 151 or another portion of valve assembly 150 may be used to bias the valve(s) towards a closed configuration, as previously mentioned.

Alternatively, a hinge or hinges may be configured to bias valve flaps 152 towards a closed position in which valve flaps 152 cover, either partially or wholly, aspiration inlets 125 and/or 155. Upon actuation of inflator 140, valve assembly 150 is therefore preferably configured to open to allow for introduction of ambient air into airbag cushion 102 (see FIGS. 6 and 7) through aspiration. This may be accomplished by the forces from inflation gas through nozzles 135, by a change in pressure resulting from the inflation gas delivered through nozzles 135, and/or by airbag cushion 102 being deployed and expanded to create a partial vacuum therein. In other words, nozzles 135 may be configured such that delivery of inflation gas through nozzles 135 results in a sufficient change in pressure to indirectly open valve flaps 152 upon actuation of inflator 140. Thus, preferably a valve defined by valve flaps 152 comprises a one-way, passive valve. In addition, as will be more apparent in connection with the discussion below, preferably this valve is configured to automatically close at a predetermined stage during inflation of airbag cushion 102, which stage may be dictated by the pressure differentials associated with the airbag cushion. Although a passive valve may be preferred for certain embodiments, such as for cost reasons, other valves, such as electrical and/or mechanical valves, may be used in alternative embodiments.

Hinges, such as spring-loaded hinges, are an example of a means for biasing an aspiration valve towards a closed position. A rigid coupling of a flexible valve flap adjacent an aspiration opening is another example of means for biasing an aspiration valve towards a closed position. As also previously mentioned, in some embodiments, a portion of valve flap(s) 152 may be formed with one or more grooves 154, which groove(s) 154 that may be configured to serve as a "hinge" for facilitating opening and/or closing of the valve by pressure differentials between the inside and outside of the airbag cushion 102 alone.

In some embodiments, one or more (in some embodiments, all) of the inflator conduits 130 may have a cross-sectional dimension that decreases in size as the inflator conduit 130 extends away from the inflator 140. This may be useful for having a uniform, or at least more uniform, distribution of gas through each of the various nozzles 135 during inflation. Thus, in some such embodiments, the cross-sectional diameter of inflator conduit(s) may have a gradual taper from inflator 140 to the distal end of each respective inflator conduit 130. However, in alternative embodiments, the cross-sectional diameter and/or other dimension may vary in other ways, such as via one or more steps or otherwise more abrupt changes in such cross-sectional diameter/dimension. In preferred embodiments, inflator conduits 130 and, in some embodiments, nozzles 135, housings 120 and/or 151, and/or the entire inflation module 110, may be made from a molded thermoplastic material.

Figure 5:
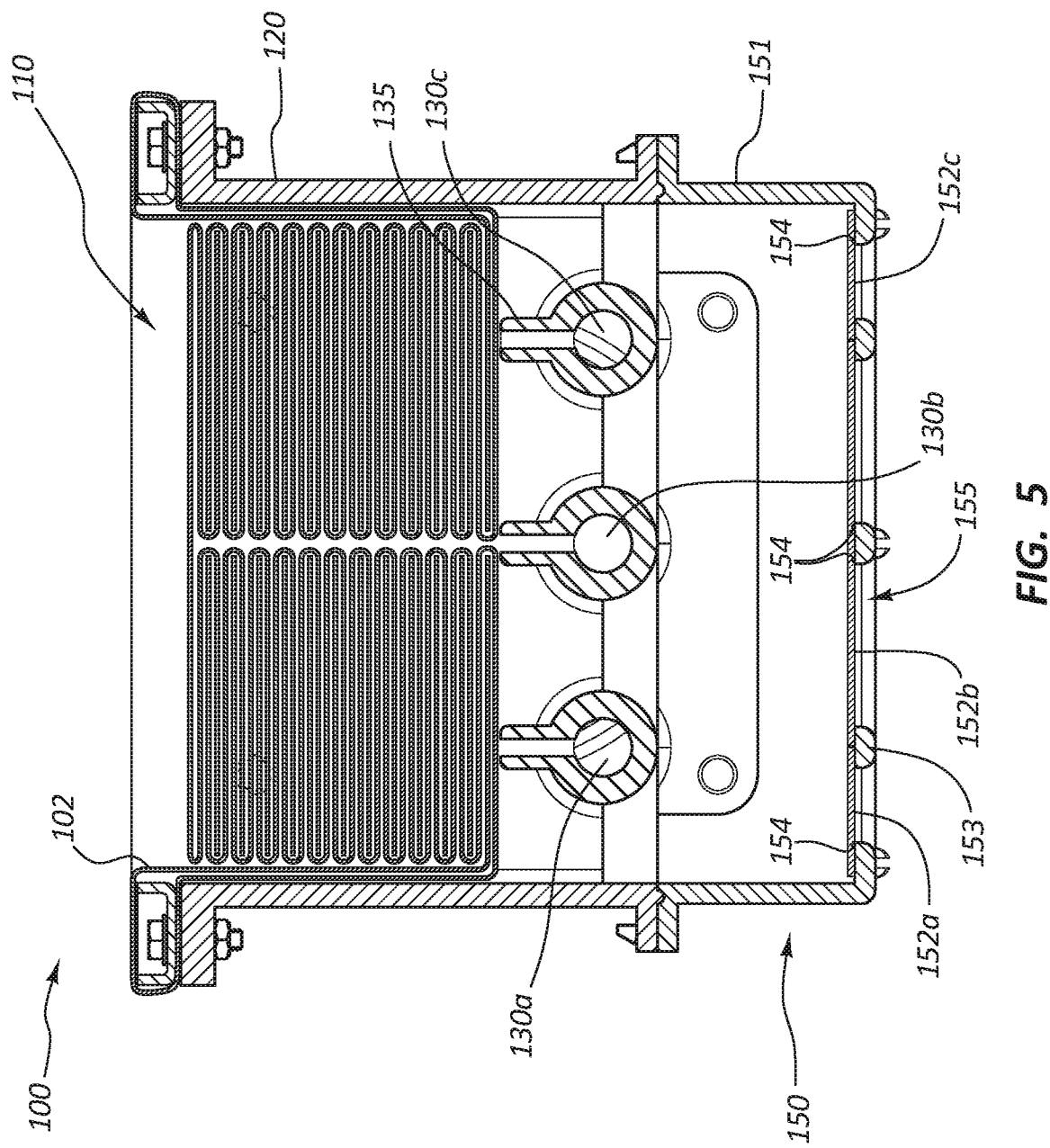
FIG. 5 is a cross-sectional view of an airbag cushion assembly comprising the airbag inflation module of FIG. 1 taken along line 5-5 in FIG. 4.

FIG. 5 is a cross-sectional view of a portion of an airbag cushion assembly 100 incorporating the inflation module 110 previously described. This figure depicts airbag cushion assembly 100 prior to inflation. As shown in this figure, airbag cushion assembly 100 comprises an airbag cushion 102. As also shown in this figure, each of valve flaps 152a, 152b, and 152c is in a closed position in which aspiration inlet 155 is blocked, thereby preventing, or at least substantially preventing, inflation gases from nozzles 135 from escaping through aspiration inlet 155.

More specifically, upon initial deployment, there may be significant pressure achieved in the cushion 102 prior to the cushion 102 breaking through a cover (the "breakout phase" of the deployment). With this high pressure, the potential for leakage out the back of the housing is very high without blocking the aspiration inlet 155. Failure to block aspiration inlet 155 may also inhibit desired cushion restraint. Following the breakout phase, it is preferred that the aspiration inlet 155 be opened as quickly as possible to allow for ambient air to assist in the inflation process.

Figure 7:
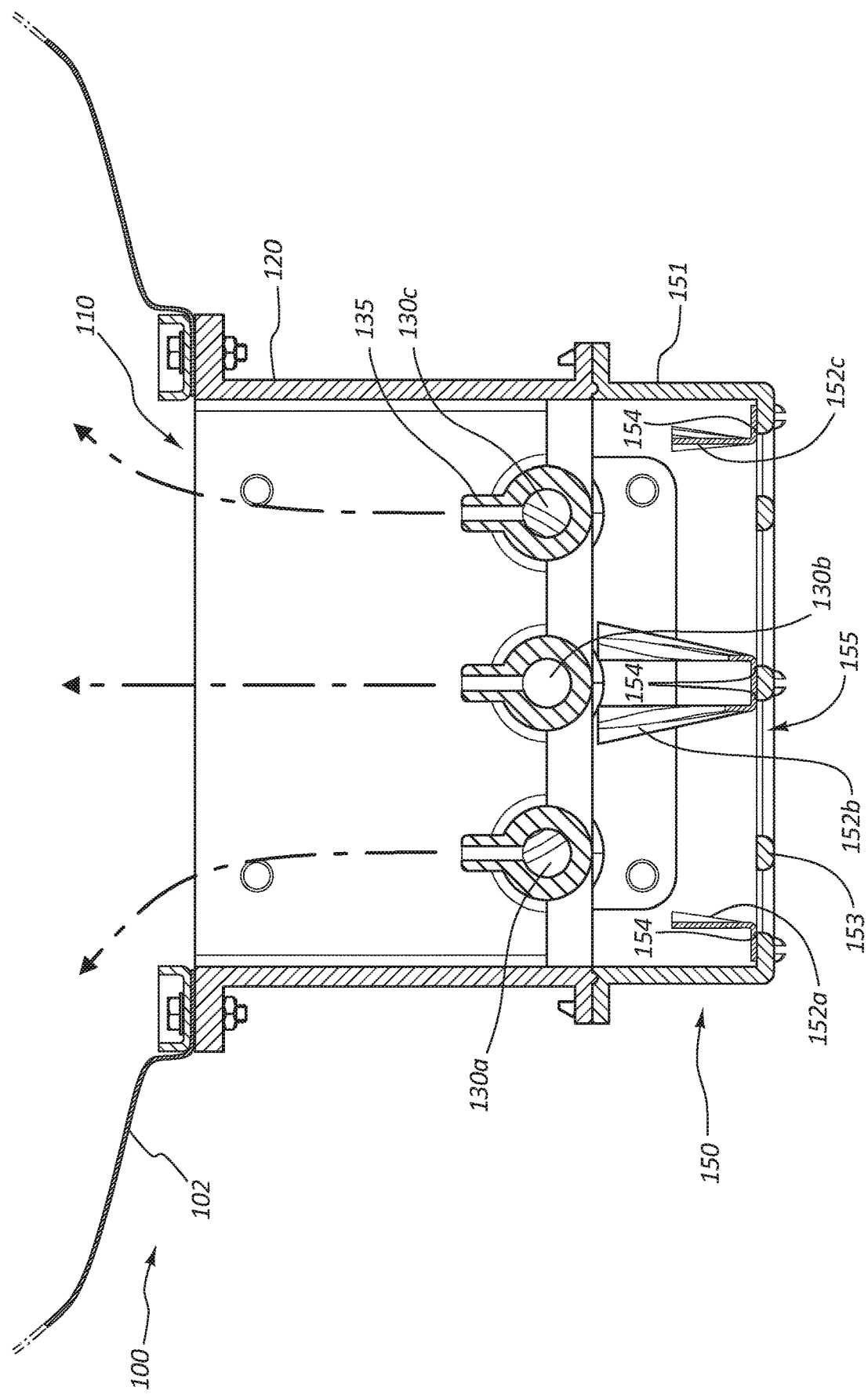
FIG. 7 is a cross-sectional view of the airbag cushion assembly of FIG. 6 taken along line 7-7 in FIG. 6.

FIGS. 6 and 7 depict airbag cushion assembly 100 during inflation of airbag cushion 102. As shown in these figures, valve flaps 152 of valve assembly 150 have been opened to allow for ambient air to enter airbag cushion 102 and facilitate inflation, as previously mentioned. As also previously mentioned, inflation nozzles 135 may be used to generate a sufficient pressure differential to allow for valve flaps 152 to automatically open. This same pressure differential may then allow ambient air to assist with inflation of airbag cushion 102. Preferably, inflation gases are introduced in a forceful manner into airbag cushion 102. Thus, in addition to and/or as an alternative to the pressure differential, the velocity and/or rate of volume of gas delivered through nozzles 135 may be sufficient to cause ambient air to be entrained within the inflation gas and therefore aspirated into airbag cushion 102 along with this inflation gas.

Preferably, valve assembly 150 is also configured to automatically close to prevent ambient air and inflation gas from exiting through aspiration inlet 155 following inflation. Thus, following the decrease of the pressure differential previously mentioned, a pressure differential developed in an opposite direction, and/or the cessation of inflation gasses being delivered through inflation nozzles 135, valve flaps 152 may be configured to automatically close again. As previously mentioned, in some embodiments, valve flaps 152 may be biased towards their respective closed positions to facilitate this stage of inflation. One or more airbag cushion vents (not shown) may be used and may be tuned to provide desired deployment/restraint characteristics.

As shown in the accompanying drawings, in preferred embodiments, the valve(s), such as valve flaps 152, are preferably positioned between the aspiration inlet(s) and the inflation nozzle(s) 135. The inventors have discovered that, although alternative embodiments are contemplated in which such flaps or other valve elements may be positioned above and/or in the path of inflation gases, such designs may inhibit desired closing of the valve and allow for more leakage through the aspiration inlet(s) than may be ideal. Thus, the depicted embodiment deliberately places these valve elements below the inflation nozzles. In the depicted embodiment, the valve flaps are positioned away from a flow path of the inflation nozzles, spaced apart from nozzle openings of the inflation nozzles, and positioned between the aspiration inlet and the inflation nozzles. In the depicted embodiment, each of these statements is true in both the closed and open configurations, although alternative embodiments are contemplated in which one or more of these statements may only be true in the closed configuration and/or one or more (or all) of these statements may not true.

In addition, although the depicted embodiment comprises non-overlapping valve flaps 152, other embodiments are contemplated in which the valve flaps may overlap, either fully or partially, with one another in a desired manner.

Figure 8:
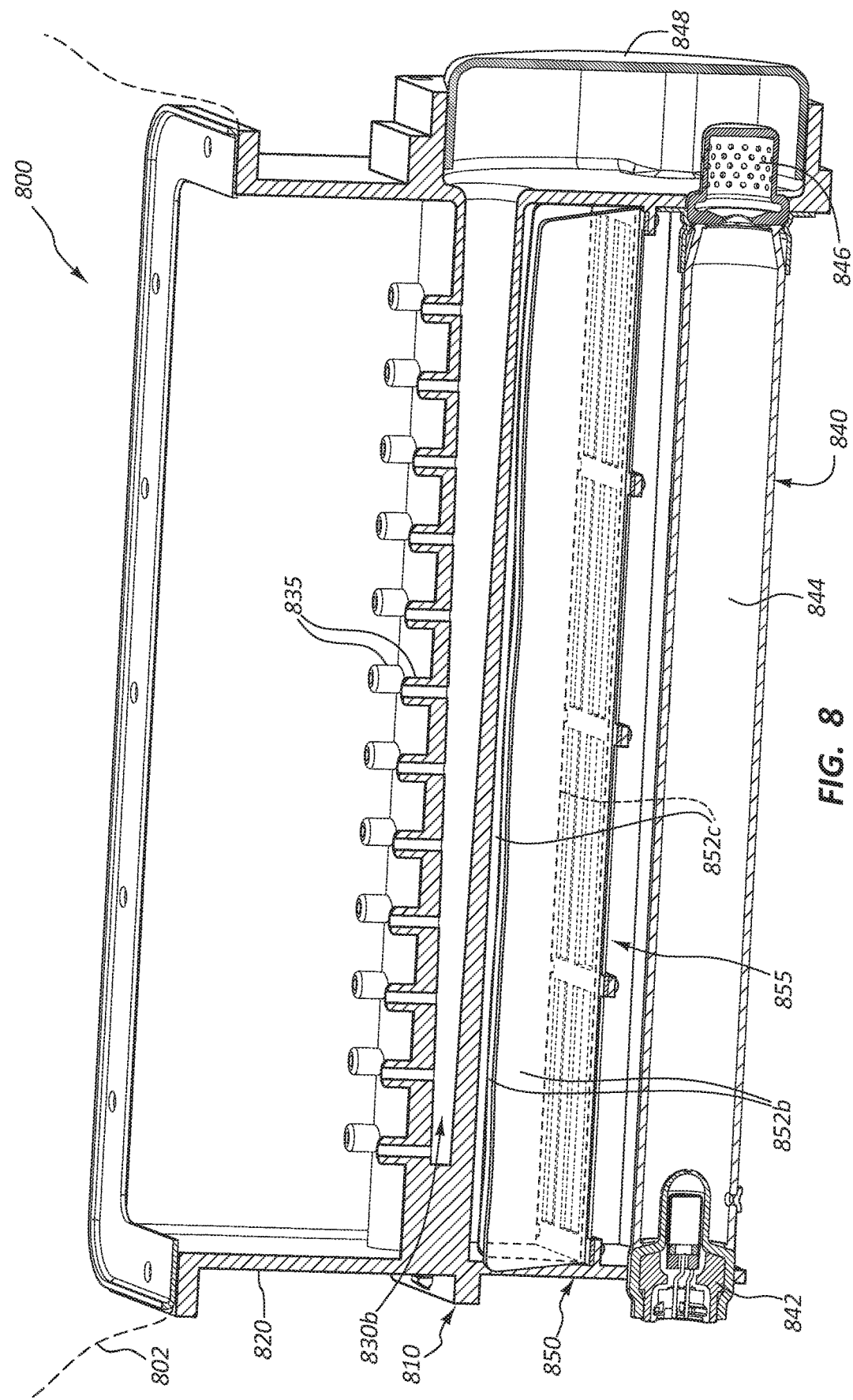
FIG. 8 is a cross-sectional view of another embodiment of an airbag cushion assembly comprising a compressed gas inflator.
Figure 9:
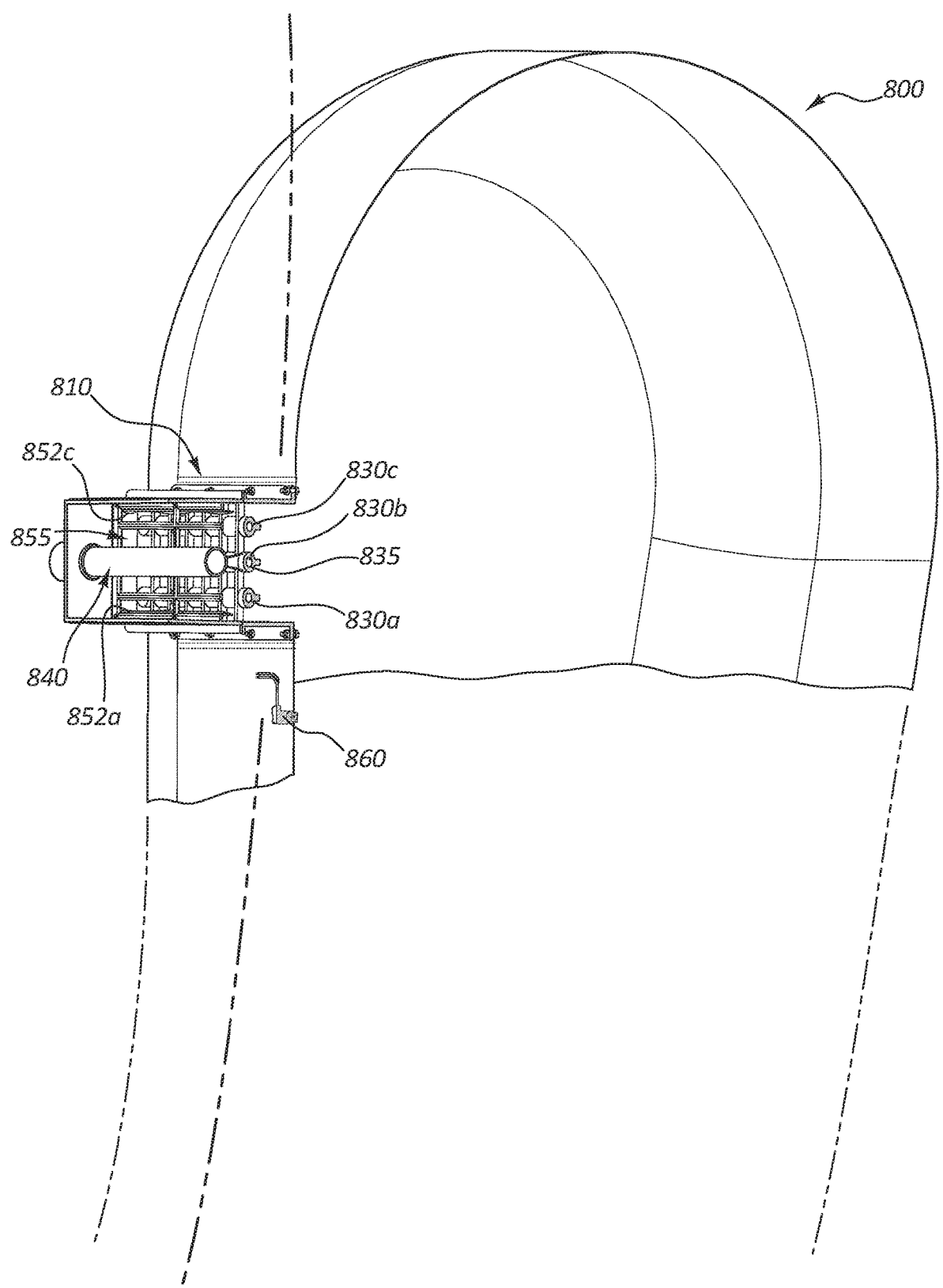
FIG. 9 is a partial, cross-sectional view of the airbag cushion assembly of FIG. 8.

FIGS. 8 and 9 depict an alternative embodiment of an airbag cushion assembly 800 having a valve assembly 850 positioned below a series of inflation nozzles 835, which, as previously mentioned, may be arranged in two or more rows and may be fed by respective inflation conduits (inflation conduit 830b is shown in cross-section in FIG. 8) positioned within housing 820. Inflation module 810 is coupled to airbag cushion 802 and, as previously mentioned, may comprise an open bottom side having an aspiration inlet that allows for ambient gas to be aspirated into airbag cushion 802 upon actuation. As best shown in FIG. 8, one or more of inflation conduits 830a, 830b, and 830c may comprise a cross-sectional diameter or another dimension that decreases as the distance from an inflator, or, in this case, gas distribution chamber 848, increases. In this manner, the velocity and other volume of gas per unit time through each of the inflation conduits 830 and/or nozzles 835 may be made more uniform. Thus, in some embodiments, each of nozzles 835 may be configured to deliver a flow of air that is at least substantially uniform relative to the other nozzles 835.

Inflation module 810 differs from inflation module 110 in that it comprises an inflator 840 that comprises a chamber 844 of compressed inflation gas. Inflator 840 may further comprise an initiator 842 and a diffuser 846 positioned on opposite ends of chamber 844. Inflation module 810 may further comprise a gas distribution chamber 848 positioned adjacent to diffuser 846 at the end of chamber 844 from which inflation gas is configured to be delivered. Gas distribution chamber 848 is fluidly coupled with each of the inflation conduits 830a, 830b, and 830c such that gas from chamber 844, upon deployment, can be delivered through each of the inflation conduits 830a, 830b, and 830c and, ultimately, through each of the various nozzles 835, which may comprise high-velocity nozzles, fluidly coupled thereto.

Chamber 844 preferably comprises a gas mixture comprising a flammable and/or volatile gas and an inert gas that may be ignited within an airbag cushion to allow for more rapid inflation of certain larger airbag cushions, such as cushions for multiple occupants or pedestrian cushions, for example. In some embodiments, chamber 844 lacks an oxidizing gas. In such embodiments, oxygen obtained from the ambient air during aspiration, as previously discussed, may be used as an oxidizing gas during ignition of the gas within the airbag cushion. In some embodiments, the flammable gas may comprise at least one of hydrogen and methane, and the inert gas may comprise at least one of nitrogen and argon. In some such embodiments, the gas mixture may comprise, for example, flammable gas or gases (such as hydrogen, for example) in an amount between about 30 mol % and about 40 mol %, and may comprise inert gas or gases (such as argon, for example) in an amount between about 60 mol % and about 70 mol %. However, it is contemplated that any gaseous hydrocarbon in the range of about minus 40 degrees Celsius to about 90 degrees Celsius at the typical storage pressures in a compressed gas inflator may be acceptable for certain embodiments. In addition, although it may be preferred to combine the flammable and inert gases into a single chamber, alternative embodiments are contemplated in which these gases may be in separate chambers and/or introduced separately.

FIG. 9 depicts a broader view of airbag cushion assembly 800 incorporating inflation module 810, valve assembly 850, and compressed gas inflator 840. As shown in this figure, airbag cushion assembly 800 comprises an airbag cushion 802 and a one-way valve assembly 850 configured to automatically open airbag cushion 802 to introduction of ambient air through aspiration inlet 855 during inflation and then automatically close aspiration inlet 855 after sufficient inflation has taken place. As previously mentioned, this automatic opening may take place as a result of a vacuum or pressure differential within airbag cushion 802 caused by inflation gas being introduced at a high velocity through nozzles 835. Similarly, at a predetermined stage during inflation, this pressure differential may drop and/or be reversed to allow the valve of valve assembly 850, such as flaps 852a, 852b, and 852c, to close.

Valve assembly 850 preferably comprises one or more flaps 852 made up of a relatively rigid material (at least compared to the fabric of airbag cushion 802). In some embodiments, this valve may be configured to operate in a desired manner simply by rigidly coupling such flaps adjacent to aspiration inlet 855. Alternatively, flap(s) 852 may be hinged at one end such that flap(s) 852 are biased towards their respective closed positions. Some embodiments may comprise flaps that partially or fully overlap with one another. In addition, although, as seen in FIG. 8, center flap 852b may comprise a first portion configured to cover a first opening or plurality of openings of aspiration inlet 855 (from the perspective of FIG. 8, a first portion configured to cover openings extending into the page and a second portion configured to cover openings extending out of the page and not visible in this figure). However, of course, this single flap may instead be replaced with two separate flaps or other valves in alternative embodiments.

As shown in FIG. 9, airbag cushion assembly 800 further comprises a second initiator/igniter 860, which may be positioned to extend within airbag cushion 802. After introducing a sufficient volume of inflation gases and ambient air through aspiration, initiator 860 may be configured to ignite a flammable gas inside airbag cushion 802 comprising the gas mixture from chamber 844 and ambient air. The resulting combustion reaction may then complete the process of inflating airbag cushion 802. This process may allow for rapid inflation of relatively large airbag cushions (in some embodiments, cushions of 600 L or more). In some embodiments, the flaps 852 and/or valves of valve assembly 850 may be configured to be closed by the force from the ignition of the gases within airbag cushion 802 by initiator 860.

In some embodiments, initiator 860 may be configured to deploy at a particular, desired point during introduction of the gas mixture and ambient air. For example, in some preferred embodiments, initiator 860 may be configured to ignite the combined air and gas mixture following depletion/expulsion of all of the gases from chamber 844. Preferably, however, there is no delay, or at least substantially no delay, between such depletion/expulsion and the ignition. Thus, in some embodiments, the spark from initiator 860 may be delivered near the end of, rather than technically following, the process of introducing gases from chamber 844 into airbag cushion 802 along with ambient air. As shown in FIG. 9, in some embodiments, initiator 860 may be spaced apart from inflator module 810 rather than directly coupled with inflator module 810. However, alternative embodiments are contemplated in which this initiator/igniter 860 may instead be incorporated into and/or directly coupled with inflator module 810. Either way, preferably initiator 860 is positioned to extend into airbag cushion 802 or otherwise make contact with the gas within airbag cushion 802 delivered from inflator 840.

Figure 10:
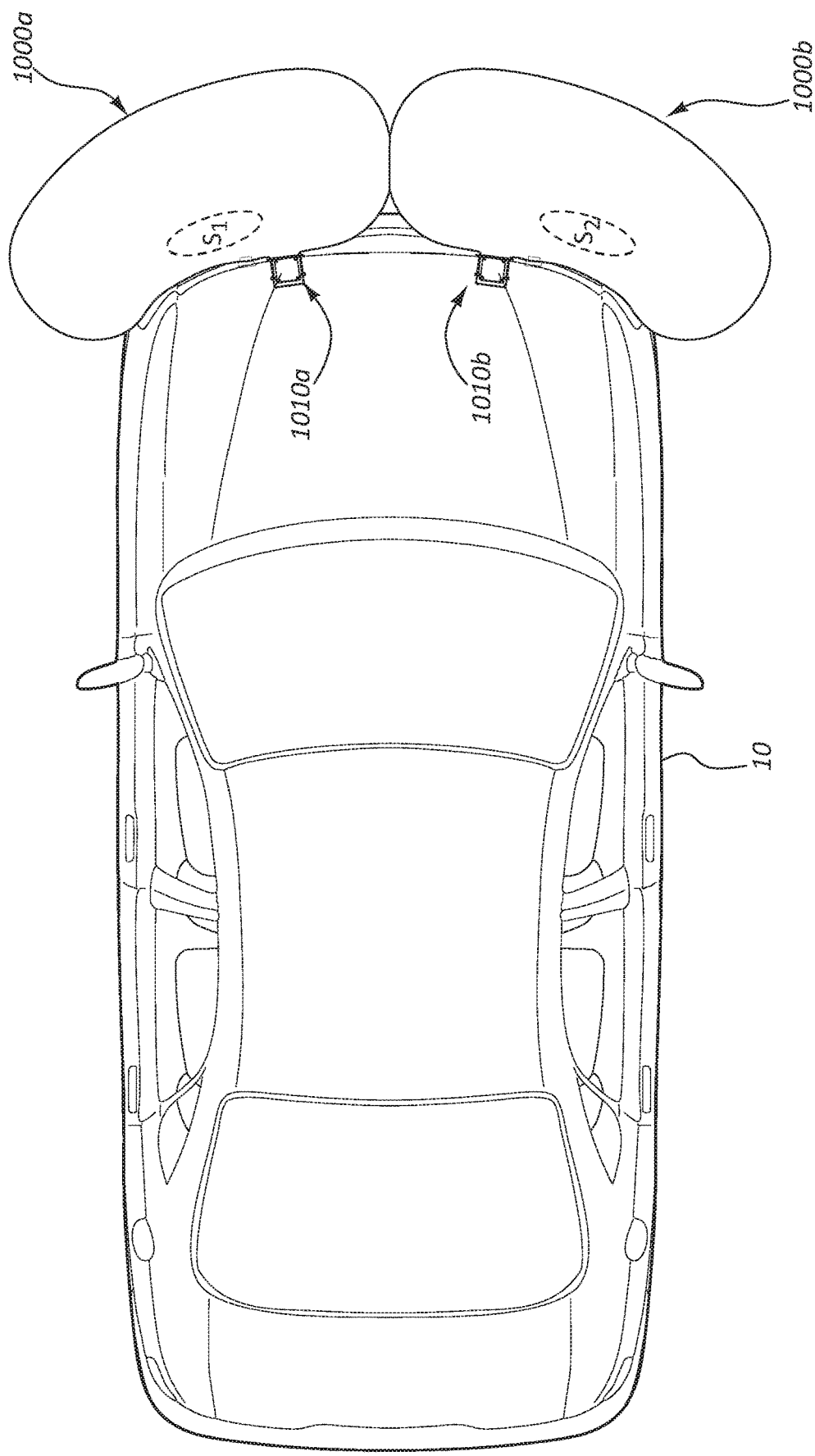
FIG. 10 is an upper plan view of a vehicle incorporating two airbag cushion assemblies as pedestrian airbags according to some embodiments.

Because of the implications of deploying an airbag by way of ignition of a flammable gas in an occupant space, airbag cushion assembly 800 may be particularly useful for pedestrian airbags configured to be deployed from an exterior surface of a vehicle during an impact so as to cushion a pedestrian during the impact, or other airbags configured to deploy outside an enclosed occupant space. Thus, FIG. 10 depicts a vehicle 10 incorporating two external/pedestrian airbag cushion assemblies 1000a and 1000b configured to be inflated by aspirating airbag inflation modules 1010a and 1010b, respectively, which may comprise compressed gas chambers, as previously mentioned.

Vehicle 10 may further comprise one or more sensors, such as pre-crash sensors S1/S2. In some embodiments, a separate sensor may be used for each airbag cushion assembly, as shown in FIG. 10. Such sensors may be useful in allowing for inflation to take place in sufficient time before impact with a pedestrian in order to provide a sufficient cushion for impact. In some embodiments, sensors S1 and/or S2 may comprise pre-crash sensors incorporating, for example, cameras, radar, and/or lasers.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications and changes are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
    an airbag cushion;
    an inflation module comprising an aspiration side and an inflation side, the inflation module comprising:
        an inflator;
        a plurality of inflation nozzles fluidly coupled with the inflator, wherein the plurality of inflation nozzles is configured to deliver inflation gas from the inflator into the airbag cushion from the inflation side of the inflation module, and wherein each of the plurality of inflation nozzles is fluidly coupled with at least one inflation conduit having a cross-sectional diameter that tapers along at least a portion thereof, wherein the at least one inflation conduit comprises a closed terminal end, and wherein each of the plurality of inflation nozzles is configured to deliver an at least substantially uniform distribution of gas relative to each other;
        a housing coupled to the airbag cushion adjacent to the inflation side of the inflation module, wherein the housing comprises an aspiration inlet defined by a plurality of cross-members, wherein the aspiration inlet is configured to allow for receipt of ambient air into the airbag cushion during inflation of the airbag cushion, and wherein the plurality of inflation nozzles is configured to, upon actuation of the inflator, draw ambient air into the airbag cushion along with the inflation gas from the inflator;
        a valve assembly comprising at least one valve flap configured to open upon actuation of the inflator, wherein the at least one valve flap is biased towards a closed position, wherein the at least one valve flap is configured to close during inflation of the airbag cushion to prevent air and inflation gas from exiting through the aspiration inlet, wherein the at least one valve flap is positioned between the aspiration inlet and the plurality of inflation nozzles, wherein the at least one valve flap further comprises at least one groove configured to function as a hinge to facilitate opening and/or closing of the at least one valve flap during inflation, wherein the at least one valve flap is coupled to at least one of the plurality of cross members along an inner surface of the at least one of the plurality of cross members facing towards the plurality of inflation nozzles, and wherein the at least one groove extends at least substantially parallel to at least one of the plurality of cross-members.

2. The airbag cushion assembly of claim 1, wherein the aspiration side of the inflation module is positioned opposite from the inflation side.

3. The airbag cushion assembly of claim 1, wherein the plurality of inflation nozzles comprises a plurality of high-velocity nozzles.

4. The airbag cushion assembly of claim 1, wherein the at least one valve flap is configured to automatically close at a predetermined stage during inflation of the airbag cushion.

5. The airbag cushion assembly of claim 1, wherein the at least one valve flap comprises a plurality of valve flaps.

6. The airbag cushion assembly of claim 5, wherein at least one of the plurality of valve flaps comprises a butterfly flap configured to automatically open and close at least two separate openings of the aspiration inlet.

7. The airbag cushion assembly of claim 1, wherein the housing comprises:
    an inflation housing, wherein the plurality of inflation nozzles is positioned within the inflation housing; and
    a valve assembly housing coupled with the inflation housing, wherein the valve assembly is positioned within the valve assembly housing.

8. An airbag cushion inflation module, comprising:
    an inflator housing comprising an aspiration inlet configured to allow for receipt of ambient air into the airbag cushion during inflation of an airbag cushion coupled with the airbag cushion inflation module;
    an inflator;
    a plurality of inflation conduits, wherein each of the plurality of inflation conduits is spaced apart from of the airbag cushion;
    a plurality of high-velocity nozzles configured to deliver inflation gas from the inflator, wherein each of the plurality of high-velocity nozzles is configured to, upon actuation of the inflator, draw ambient air through the aspiration inlet, wherein each of the plurality of high-velocity nozzles is fluidly coupled with at least one inflation conduit of the plurality of inflation conduits having an internal cross-sectional size that decreases in a direction from the inflator to a side of the at least one inflation conduit opposite the inflator, and wherein each of the plurality of inflation conduits comprises a closed terminal end opposite the inflator; and
    a valve assembly comprising at least one valve flap coupled to an inner surface of a structural cross member of the valve assembly facing the inflator housing, wherein the at least one valve flap is configured to open upon actuation of the inflator, wherein the valve assembly is configured to bias the at least one valve flap towards a closed position in which the aspiration inlet is blocked, wherein the at least one valve flap is configured to close following aspiration of an airbag cushion coupled with the airbag cushion inflation module to prevent air and inflation gas from exiting through the aspiration inlet following inflation of the airbag cushion, and wherein the at least one valve flap further comprises at least one groove configured to function as a hinge to facilitate opening and/or closing of the at least one valve flap during inflation.

9. The airbag cushion inflation module of claim 8, wherein the valve assembly is configured such that the at least one valve flap is spaced apart from nozzle openings of the plurality of high-velocity nozzles.

10. The airbag cushion inflation module of claim 8, wherein the valve assembly is configured such that the at least one valve flap is fully positioned on an opposite side of the plurality of high-velocity nozzles relative to the airbag cushion in both an open position in which the aspiration inlet is open and a closed position in which the aspiration inlet is closed by the at least one valve flap.

11. The airbag cushion inflation module of claim 8, wherein the valve assembly is configured such that the at least one valve flap is positioned away from a flow path of the plurality of high-velocity nozzles.

12. The airbag cushion inflation module of claim 8, further comprising a valve assembly housing, wherein the at least one valve flap is positioned within the valve assembly housing.

13. The airbag cushion inflation module of claim 12, wherein the valve assembly housing is positioned on an opposite side of the plurality of high-velocity nozzles relative to the airbag cushion.

14. The airbag cushion inflation module of claim 8, wherein each of the plurality of inflation conduits comprises an internal cross-sectional size that tapers in diameter from an inflator side a side opposite the inflator side.

15. An airbag inflation module, comprising:
a housing configured to be coupled with an airbag cushion, wherein the housing comprises an aspiration inlet configured to allow for receipt of ambient air into the airbag cushion during inflation of the airbag cushion;
an inflator configured to facilitate inflation of the airbag cushion;
a plurality of inflation conduits;
a plurality of cross-members defining the aspiration inlet, wherein each of the plurality of cross-members comprises an inner portion facing the housing and an outer portion facing an ambient environment;
a plurality of inflation nozzles fluidly coupled with the inflator and comprising an at least substantially identical opening size, wherein each of the plurality of inflation nozzles is configured to deliver inflation gas from the inflator, wherein each of the plurality of inflation nozzles is configured to, upon actuation of the inflator, draw ambient air though the aspiration inlet along with the inflation gas from the inflator, and wherein each of at least a subset of the plurality of inflation nozzles is fluidly coupled with an inflation conduit of the plurality of inflation conduits having a cross-sectional area that decreases in size as a distance from an opening of the inflation conduit fluidly coupled with the inflator increases; and
a valve assembly positioned between the plurality of inflation nozzles and the aspiration inlet, wherein the valve assembly is configured to function in an open position in which ambient air is allowed to pass through the aspiration inlet and a closed position in which at least a portion of the valve assembly at least substantially blocks the aspiration inlet, and wherein the valve assembly comprises at least one valve flap, wherein the at least one valve flap comprises at least one groove formed within the at least one valve flap, wherein the at least one valve flap is coupled to at least one of the plurality of cross members along the inner portion of the at least one of the plurality of cross members, and wherein the at least one groove is formed adjacent to the at least one of the plurality of cross members.

16. The airbag inflation module of claim 15, wherein the valve assembly comprises a plurality of valve flaps, and wherein the plurality of valve flaps is configured to automatically open and close during inflation of the airbag cushion from pressure differentials between an inside of the airbag cushion and ambient air pressure.

17. The airbag inflation module of claim 15, further comprising means for biasing the at least one valve flap towards the closed position.

18. The airbag inflation module of claim 15, wherein the at least one valve flap comprises a flexible material configured to flex and change shape during aspiration.

19. The airbag inflation module of claim 15, wherein each of the plurality of inflation conduits comprises a cross-sectional diameter that decreasingly tapers in size in a direction away from the opening of the inflation conduit fluidly coupled with the inflator.

* * * * *